Jan. 3, 1939.  O. KODAIRA  2,142,790

CONTAINER FOR OIL, LARD, OR THE LIKE

Filed June 29, 1937

Inventor:
O. Kodaira
by Connolly Bros
Attys

Patented Jan. 3, 1939

2,142,790

UNITED STATES PATENT OFFICE 2,142,790

CONTAINER FOR OIL, LARD, OR THE LIKE

Otozo Kodaira, Kohinata, Koishikawa-ku, Tokyo, Japan

Application June 29, 1937, Serial No. 150,998

1 Claim. (Cl. 221—11)

This invention has relation to containers for oil, lard and the like and consists of a hollow vessel adapted for the reception and discharge of its contents as required and especially adapted for domestic use, the construction and arrangement of the vessel being such that the material constituting the contents thereof is filtered while the vessel is being filled and from which the material may be poured according to requirements without loss and in a safe and sanitary manner.

The invention is illustrated in the accompanying drawing in which—

Figure 1:
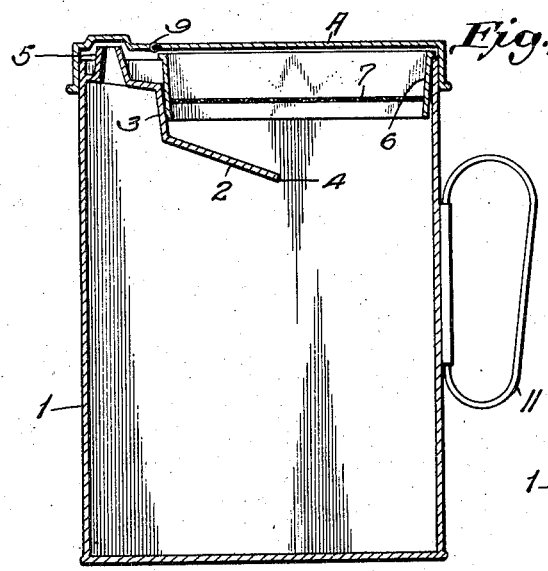
Fig. 1 is a sectional view of the containing vessel diagrammatically represented, the covering and protecting cap being closed.
Figure 2:
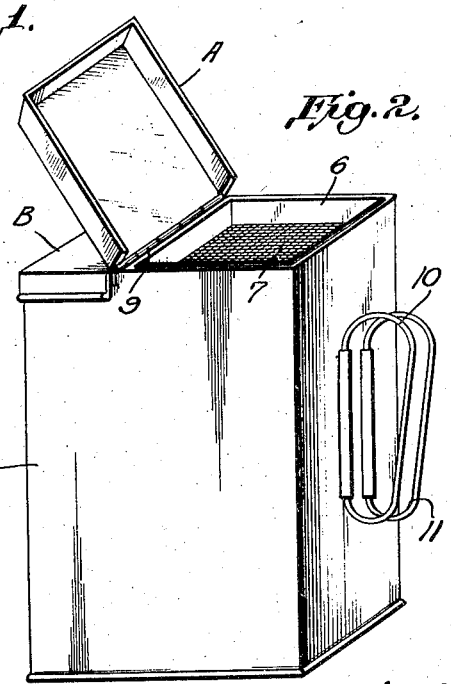
Fig. 2 is a perspective view, with one of the lid sections raised and exposing the screen or filter.

As shown in the drawing the container consists of a hollow vessel 1, preferably of rectangular form, comprising four walls and a closure composed of two flanged rectangular sections A and B, which are hinged together as shown at 9 and may be separately raised and closed or both lowered.

Figure 4:
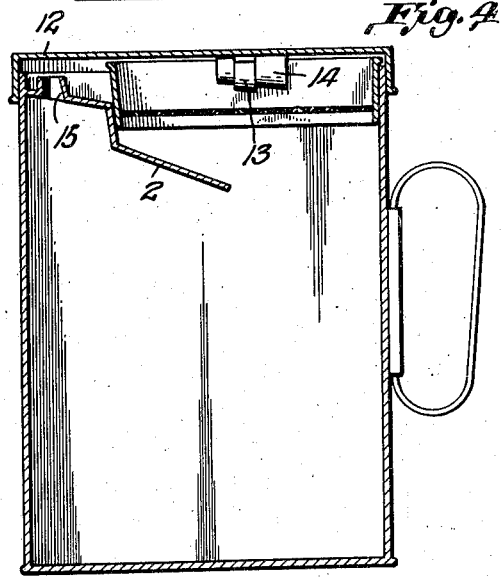
Fig. 4 is a sectional view of the containing vessel with a modification of the emptying tap.
Figure 5:
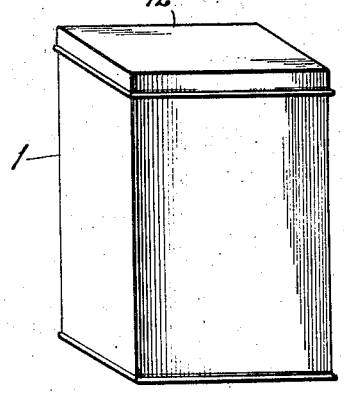
Fig. 5 is a perspective view of the container completely closed.

In Figures 1 and 4 a slanting plate 2 is provided and supported by three innerside walls of the vessel. This plate has a shouldered part 3 and ends downwardly in one free edge 4. A tap 5 is disposed on the upper part of the plate 2 slightly jutting out above the edge plane of the vessel 1. 6 is a filter which is dish shaped and has a meshed bottom 7. The filter is removably situated between the shoulder 3 and the upper end parts of the vessel 1.

Figure 3:
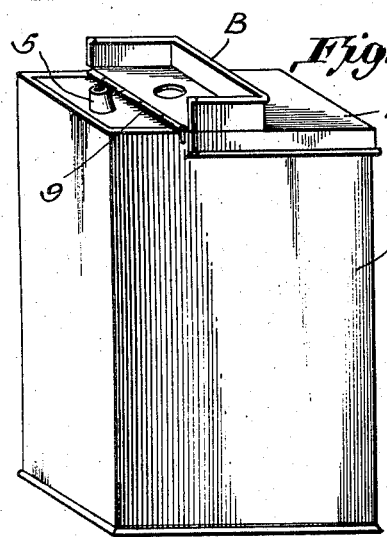
Fig. 3 is a perspective view of the vessel with the screen closed and the other lid section raised and exposing the discharge tap.

The operation and use of the container are as follows: When oil or hot lard is poured into the filter which has been previously exposed by turning upwards the lid section A, lumps contained in the oil or lard are caught on the meshed bottom of the filter and the oil or lard is strained down along the slanting plate. If the lid section A is closed the contents of the vessel is protected against flies, dust or other impurities. When there is need for the contents of the vessel, the lid section B is turned back as shown in Fig. 3 and the contents of the vessel can be poured out easily and safely by grasping the handles 10, 11. When the pouring ceases the lid section B may be closed as shown in Fig. 1 and the contents remaining in the vessel well protected.

In the described and claimed container embodying the invention oil or lard are not allowed to flow over the outside of the vessel or beyond the discharging tap, this being prevented by the slanting plate. The liquid adhering to the plate flows without loss of oil over the outside of the vessel, by flowing downward over the plate and back into the vessel.

The filter can be removed from the vessel as desired and thus easily cleaned by removal of the accumulations thereon.

I claim:

A container for fluid material, comprising a hollow containing vessel having at one and the same end, an inlet and an outlet, separate from each other, said inlet being dish shaped and composed of side and end walls and detachable from the containing vessel and the outlet being a spout for the outpour of the contents of the vessel, the inlet element being provided with a strainer and the vessel provided with a lid composed of two hinged sections constructed, arranged and adapted to concurrently or separately close the inlet and out passages, the vessel having below the spout an inclined plate to receive and direct the back flow of fluid dripping from the spout.

OTOZO KODAIRA.